(12) United States Patent
Nilsson et al.

(10) Patent No.: US 9,746,366 B2
(45) Date of Patent: Aug. 29, 2017

(54) RADAR LEVEL GAUGING

(71) Applicant: Rosemount Tank Radar AB, Gothenburg (SE)

(72) Inventors: Valter Nilsson, Hovas (SE); Fabian Wenger, Gothenburg (SE)

(73) Assignee: Rosemount Tank Radar AB, Gothenburg (SE)

( * ) Notice: Subject to any disclaimer, the term of this patent is extended or adjusted under 35 U.S.C. 154(b) by 352 days.

(21) Appl. No.: 14/556,652

(22) Filed: Dec. 1, 2014

(65) Prior Publication Data

US 2016/0153821 A1   Jun. 2, 2016

(51) Int. Cl.

| | |
|---|---|
| *G01F 23/00* | (2006.01) |
| *G01F 23/284* | (2006.01) |
| *G01S 13/22* | (2006.01) |
| *G01S 13/12* | (2006.01) |
| *G01S 7/28* | (2006.01) |
| *G01S 13/88* | (2006.01) |

(52) U.S. Cl.
CPC ........ *G01F 23/284* (2013.01); *G01F 23/0069* (2013.01); *G01S 7/28* (2013.01); *G01S 13/12* (2013.01); *G01S 13/227* (2013.01); *G01S 13/88* (2013.01)

(58) Field of Classification Search
CPC .... G01F 23/0069; G01F 23/284; G01S 13/12; G01S 13/227; G01S 13/88; G01S 7/28
USPC ........................................................ 342/124
See application file for complete search history.

(56) References Cited

U.S. PATENT DOCUMENTS

| | | | |
|---|---|---|---|
| 6,867,730 B2 | 3/2005 | Gottwald et al. | |
| 2008/0105048 A1* | 5/2008 | Nilsson | G01F 23/284 73/290 V |
| 2011/0140951 A1 | 6/2011 | Nyberg | |
| 2012/0274500 A1 | 11/2012 | Nyberg | |
| 2013/0300595 A1 | 11/2013 | Hemmendorff | |

OTHER PUBLICATIONS

European Search Report from EP Application No. 15197038.1, dated May 9, 2016.

* cited by examiner

*Primary Examiner* — Timothy A Brainard
(74) *Attorney, Agent, or Firm* — Westman, Champlin & Koehler, P.A.

(57) ABSTRACT

Method for determining product surface distance in a tank comprising:
  i) generating a transmission signal as a first pulse train;
  ii) generating a reference signal having a second pulse train by time delaying said first pulse train;
    wherein each pulse in said first and second pulse trains have essentially identical waveforms and pulse repetition frequency;
  iii) guiding said transmission signal towards the product surface;
  iv) receiving a reflected signal;
  v) forming a correlation value based on a time correlation between the reference signal and the reflected signal;
  vi) carrying out steps i) to v) in sequence for at least three different pulse repetition frequencies, until at least three pairs of correlation values and associated pulse repetition frequencies have been stored;
  vii) determining said distance based on said at least three pairs of correlation values and associated pulse repetition frequencies, and said fixed time delay.

15 Claims, 4 Drawing Sheets

RADAR LEVEL GAUGING

TECHNICAL FIELD

The present invention relates generally to a method and a radar level gauge for determining a propagation delay for a signal emitted into a tank and reflected by a surface of a content in the tank. More specifically, the invention relates to radar level gauging based on detecting the correlation between a transmission signal and reference signal, each being in the form of a pulse train.

BACKGROUND OF THE INVENTION

Radar level gauges are used for making non-contact measurements of the level of products such as process fluids, granular compounds and other materials. These devices utilize an antenna or a probe to transmit electromagnetic waves toward the material being monitored and to receive electromagnetic echoes which are reflected at the surface of the material being monitored. The relationship between transmitted and received waves is then used to determine the location of the reflection, i.e. the surface. In a pulsed radar level gauge, constant power electromagnetic pulses are transmitted into the tank with a repetition frequency typically in the range 100 kHz to a few MHz. The pulses can be DC pulses or modulated by a microwave frequency carrier wave. The pulse can be guided by a wave guiding structure into the tank, or be allowed to propagate freely. On the receiver side, a reflection from the interior of the tank is received, and a low frequency analogue tank signal is formed and then digitized to form a digital time domain reflectometry (TDR) signal. The location of a surface echo is determined by identifying peaks in this TDR-signal using amplitude detection. However, amplitude detection as the only method for identifying the location of an echo in the tank signal suffers from limitations. The reason is that the peak is in fact the envelope of a waveform, making a small shift of the waveform very difficult to detect. In order to obtain a satisfactory result, the envelope needs to have a sharp peak, leading to strict requirements for pulse modulation of the signal when relying on amplitude detection. In addition to this, the resolution of A/D converter needs to be relatively high, as limitations in system causing saturated signals may further reduce measurement performance. The situation is illustrated in FIG. 1, showing a waveform representing a reflection of a modulated pulse being slightly shifted a time 6 between two locations, and the resulting, almost undetectable, difference in envelope maximum.

GENERAL DISCLOSURE OF THE INVENTION

It is an object of the present invention to relax the system requirements, and to provide an improved method for accurate detection of surface echoes in a tank signal.
According to a first aspect of the invention, this and other objects are achieved by a method for determining a distance to a surface of a product in a tank based on a time delay of electromagnetic signals propagating between a predefined reference and a surface of said product, said method comprising the steps of:
i) generating a transmission signal in the form of a first pulse train having a predetermined pulse repetition frequency, said first pulse train comprising at least 5 pulses having a constant pulse repetition frequency;
ii) generating a reference signal in the form of a second pulse train by generating a predefined and fixed time delay between said first and second pulse trains relative each other;
wherein each pulse in said first and second pulse trains have essentially identical waveforms;
iii) guiding said transmission signal into the tank as electromagnetic signals, and allowing said signals to propagate towards said surface;
iv) receiving a reflected signal reflected from the tank;
v) forming a correlation value based on a time correlation between a pulse of the reference signal and the reflected signal, and storing said correlation value and the associated pulse repetition frequency;
vi) carrying out steps i) to v) in sequence for at least three different pulse repetition frequencies, until at least three pairs of correlation values and associated pulse repetition frequencies have been stored;
vii) determining said distance based on said at least three pairs of correlation values and associated pulse repetition frequencies, and said fixed time delay between the reference signal and the transmission signal.

According to a second aspect of the invention, the above object and other objects are achieved by a radar level gauge system for determining a distance to a surface of a product kept in a tank based on a time delay of electromagnetic signals propagating between a predefined reference and a surface of said product, said radar level gauge system comprising:
a transmitter for transmitting a transmission signal in the form of a first pulse train having a constant pulse repetition frequency and comprising at least 5 pulses,
a propagation device adapted to receive said transmission signal and guiding said transmission signal as electromagnetic signals into the tank, and allowing said signals to propagate towards said surface,
a receiver for receiving a reflected signal reflected in said tank,
a delay circuitry adapted to generate a reference signal by receiving said transmission signal and delaying the pulses in the received pulse train by a predefined and fixed time delay,
wherein each pulse in the pulse train of said transmission signal and each pulse in the pulse train of said reference signal have essentially identical waveforms,
a mixer adapted to receive said reflected signal and said reference signal, and to generate a correlation value representing a time correlation between a pulse of the reference signal and a pulse of the reflected signal,
a control circuit adapted to control the pulse repetition frequency of said transmission signal at said transmitter,
a processing circuitry adapted to receive at least three different pulse repetition frequencies and a correlation value associated with each of said at least three different pulse repetition frequencies, and to determine said distance based on said at least three different pulse repetition frequencies, the associated correlation value and the fixed time delay.

In essence, the invention is based on a realization that a target distance or a distance to a surface may be estimated by varying a PRF common for both a reference signal and a reflected signal, in order to determine coincidence between the reference signal and the reflected signal, and thereafter calculate the target distance from the "time of flight" based on the PRF value(s) that correspond(s) to a coincidence, as well as the time delay of the reference signal.

A method and a system according to the above are advantageous as regulation of the PRF usually can be managed on PRF cycle basis, which enables quick regulation response. It is usually possible to instantly change to any desired frequency within the regulation interval. This enables zooming and/or reduction of measurements for a sweep while preserving adequate resolution. This can e.g. be used to enhance sensitivity and/or reduce power depending on the system requirements.

It is also advantageous as the method may be performed by only varying the PRF, and not e.g. the time delay of the reference signal. Hence it relaxes the demand on the precision and control of the delay circuitry.

Furthermore, the method is normally performed using only one PRF generator and one radio frequency generator, hence the complexity of the system as well as the cost and normally also the energy consumption is lowered. Another advantage related to the use of only one transmitter and splitting the signal in two, is that it relaxes the demand on a "solid" or absolute reference for keeping track of the actual delay. A third advantage related to the use of only one transmitter, is that it enables zooming in, e.g. focusing on a smaller time interval within range to achieve higher sensitivity. A fourth advantage is that as only one transmitter is used and the signal is split in two, the pulse width etc. are identical for both signals.

In general, the higher the number of pulses that are used when forming the correlation value, the better the accuracy and the lower the noise. However, if only a rough value is needed it might be enough with e.g. 5 pulses or 10 pulses. However, the number of pulses may also be higher, such as 20, 50, 100, 1000 or 10 000. From a practical point of view, the number of pulses generated should normally be sufficiently many to enable an output value that is higher than the noise level. In other words, the number of pulses should normally be sufficiently many to account for e.g. the time constant and the associated mixer.

According to one example the signal generator or transmitter for transmitting a transmission signal comprises a DDS (Direct Digital Synthesizer) and/or VCO (Voltage Controlled Oscillator) and/or PLL (phased locked loop). The use of e.g. a DDS is advantageous as it enables a variation of modulation patterns to be applied on the PRF, such as patterns for tracking single or multiple echoes, and periodic scanning of complete ranges can be designed.

A wide variety of different algorithms could be used to detect the actual coincidence, e.g. a reduced sweep with a target interval where one regulates the PRF to maximize the DC output of the mixer. Furthermore, Lock-in or sweep detection can be combined in intelligent receiver designs.

Further, the same pulse repetition frequency is used both for the transmission signal and the reference signal, enabling the use of only one transmitter or signal generator and thus increasing the accuracy of the system. Therefore, the detection is independent of the pulse waveform and modulation, significantly reducing the requirements on pulse modulation.

The correlation value represents a time correlation between the pulses of the reference signal and the reflected pulses. As will be described in the following, the theoretical approach is based on a cross correlation of the reflected signal with itself. However, as long as the pulses in the transmission signal (which will be reflected) and the pulses in the reference signal (which will be delayed) have essentially the same waveform the correlation of the reflected signal with the reference pulses will give satisfactory results. It should be noted that the actual waveform itself is not important, as long as it is the same for the transmission signal and the reference signal. The correlation value may be formed by mixing the two input signals such that a pulse indicating time correlation is generated each time a reference pulse passes the time domain for the reflected signal. The pulses can then be provided to a sample-and-hold circuit to form a continuous signal.

How many different PRF:s that are generated or used for determining said first process parameter may be set in many different ways. Below follows three non-limiting examples.

According to one example, in step v) of the method according to said first aspect, the carrying out of steps i) to iv) are performed a predetermined number of times, e.g. 5 times or 10 times or 50 times or 500 times or 5 000 times or 100 000 times; generating 5, 10, 50, 500 or 100 000 different PRF:s respectively. In other words, any suitable number of PRF:s may be used, so that a any desired parts of the reflected signal may be analyzed. I.e. the part of the reflected signal that is analyzed may range from a distance corresponding to just a few micrometers to the full tank length. I.e. the generated PRF:s may cover any range from just few micrometers to the full tank length, and be evenly distributed across this length or grouped together in one or more groups. As an example, if 3 or 100 000 different PRF:s are used, these may spread over the full tank length; or be grouped together at at least one section of the reflected signal e.g. where a time coincidence between the reference signal and the reflected signal is expected to occur. In other words, the ratio between two consecutive PRF;s may be arbitrary chosen so as to fit the application at hand. According to another example, in step v) of the method according to said first aspect the carrying out of steps i) and iv) are performed until a maxima for the time correlation between the transmission signal and the reference signal has been detected or identified.

According to another example, in step v) of the method according to said first aspect the carrying out of steps i) to iv) are performed until a first condition has been met, the first condition being at least one of: the correlation value exceeds a predetermined value, the correlation value falls below a predetermined value and the correlation value is equal to a predetermined value.

Moreover, said process value may be determined based on the formula $T_E = Td - 1/PRF$, where $T_E$ is the delay time of the reflected signal relative the transmission signal, Td is the predetermined and fixed time delay of the reference signal and PRF is the pulse repetition frequency of both the reference signal and the reflected signal.

There are many different ways to determine PRF(s) that is/are to be used when computing the distance.

According to one example, in step vi) of the method according to said first aspect the step of analyzing the stored pairs of correlation values and associated pulse repetition frequencies comprises identifying and/or returning the pulse repetition frequency associated with the highest correlation value among the correlation values which was stored in step v.

According to one example, in step vii) of the method according to said first aspect the step of analyzing the stored pairs of correlation values and associated pulse repetition frequencies comprises using statistical methods such as interpolation and curve fitting to determine the pulse repetition frequency associated with the highest time correlation between the measurement signal and the reflected signal. In other words, the determined PRF might be a value in between those stored in step v).

Furthermore, if unambiguity is to be achieved it is advantageous that predetermined and fixed time delay of the reference signal is longer than 1/PRF, as well as the delay time of the reflected signal compared to the transmission signal. In other words, Td>1/PRF, and Td>$T_E$, where $T_E$ is the delay time of the reflected signal relative the transmission signal, Td is the predetermined and fixed time delay of the reference signal and PRF is the pulse repetition frequency of both the reference signal and the reflected signal.

Furthermore, advantageously the PRF is selected such that the following expression is fulfilled 1/PRF>$T_{Emax}$−$T_{Emin}$, where PRF is the pulse repetition frequency of both the reference signal and the reflected signal., $T_{Emax}$ is the time delay of the reflected signal at the lowest surface level of interest, and $T_{Emin}$ is the time delay of the reflected signal at the highest surface level of interest.

Advantageously, said transmitter comprises a pulse generator for generating a pulse train.

Further, the mixer may be arranged to provide an output pulse for each pulse of the reference signal, each output pulse being equal to a time correlation of said reference pulse and said reflected signal.

Moreover, the radar level gauge system may comprise a sample-and-hold circuit adapted to receive said output pulses from said mixer and provide a continuous output which, at every given moment, is equal to the latest output pulse from the mixer, said continuous output being used as said correlation value.

Advantageously, the predetermined and fixed time delay introduced by said delay circuit is the same for each one of said at least three different pulse repetition frequencies. According to one example, a reference echo is provided to facilitate a compensation for temperature dependence in any of the delay elements.

Furthermore, said propagation device may comprise at least one of: a probe for guided wave transmission of said electromagnetic signals, an antenna for free propagation of said electromagnetic signals, and a hollow waveguide for guided propagation of said electromagnetic signals.

BRIEF DESCRIPTION OF THE DRAWINGS

These and other aspects of the present invention will now be described in more detail, with reference to the appended drawings showing a currently preferred embodiment of the invention.

FIG. 2b is a schematic illustration of the measurement electronics unit comprised in the level gauge system illustrated in FIG. 2a.

DETAILED DESCRIPTION OF PREFERRED EMBODIMENTS

In the present detailed description, various embodiments of the radar level gauge system according to the present invention are mainly discussed with reference to a pulsed radar level gauge system of the non-contact type, in which an electromagnetic signal is propagated towards the product contained in the tank using a propagating device in the form of a radiating antenna, such as a cone antenna, a horn antenna, an array antenna or a patch antenna.

It should be noted that this by no means limits the scope of the present invention, which is equally applicable to pulsed guided wave radar (GWR) level gauge system utilizing a propagating device in the form of a probe, such as a single line probe (including a so-called Goubau probe), a two-lead probe, a coaxial probe, etc.

Figure 1:
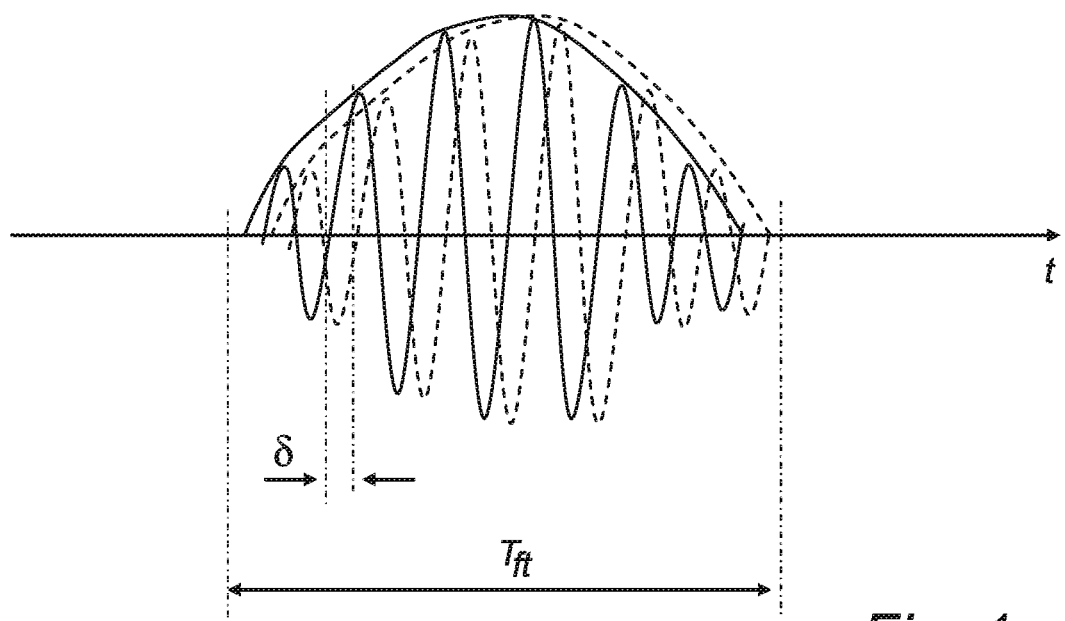
FIG. 1 is a time diagram of two reflected pulses shifted slightly in time.
Figure 2A:
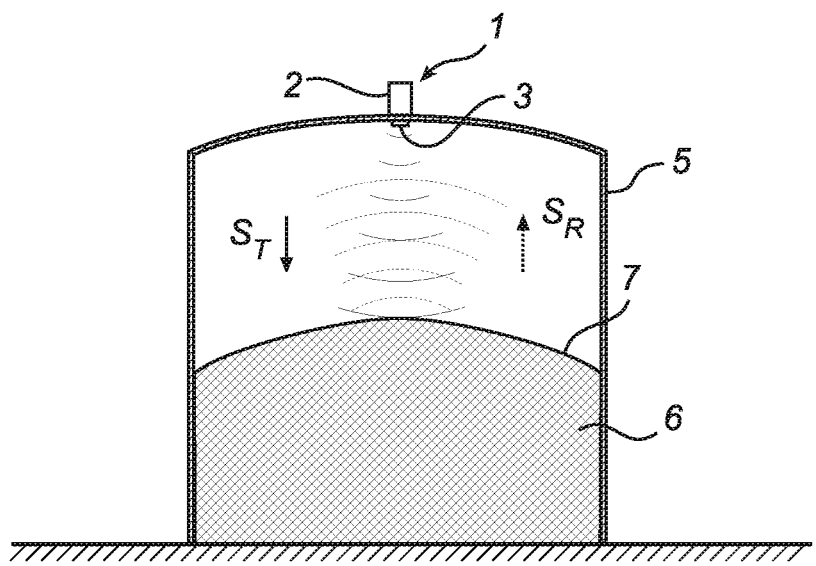
FIG. 2a schematically illustrates a level gauge system according to an embodiment of the present invention installed in an exemplary tank.

FIG. 2a schematically illustrates a level gauge system 1 according to an embodiment of the present invention, comprising a measurement electronics unit 2, and a propagation device in the form of a radiating antenna device 3. The radar level gauge system 1 is provided on a tank 5, which is partly filled with a product 6 to be gauged. In the case illustrated in FIG. 1, the product 6 is a liquid, such as water or a petroleum-based product, but the product may equally well be a solid, such as grain or plastic pellets. By analyzing a transmission signal ST being radiated by the antenna device 3 towards the surface 7 of the product 6, and a reflected signal SR traveling back from the surface 7, the measurement electronics unit 2 can determine the distance between a reference position and the surface 7 of the product 6, whereby the filling level can be deduced. The reference position may for example be the position of the antenna device 3. It should be noted that, although a tank 5 containing a single product 6 is discussed herein, the distance to any material interface present in the tank 5 can be measured in a similar manner.

Figure 2B:
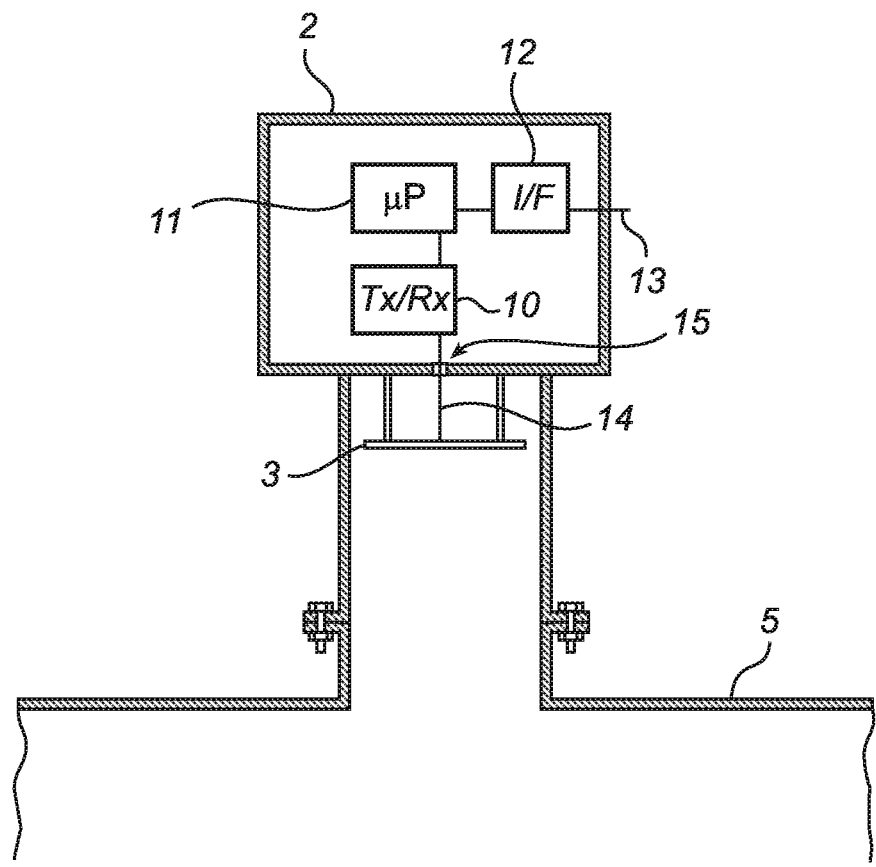

As is schematically illustrated in FIG. 2b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2b, the radar level gauge system 1 is typically connectable to an external power source, or it may be powered through the external communication lines 13. Alternatively, the radar level gauge system 1 may be powered locally, and may be configured to communicate wirelessly.

Although being shown as separate blocks in FIG. 2b, several of the transceiver 10, the processing circuitry 11 and the interface 12 may be provided on the same circuit board.

In FIG. 2b, furthermore, the transceiver 10 is illustrated as being separated from the interior of the tank 5 and connected to the antenna device 3 via a conductor 14 passing through a feed-through 15 provided in the tank wall. It should be understood that this is not necessarily the case, and that at least the transceiver 10 may be provided in the interior of the tank 5. For example, in case the antenna device 3 is provided in the form of a patch antenna as is schematically illustrated in FIG. 2b, at least the transceiver 10 and the patch antenna 3 may be provided on the same circuit board.

Figure 3:
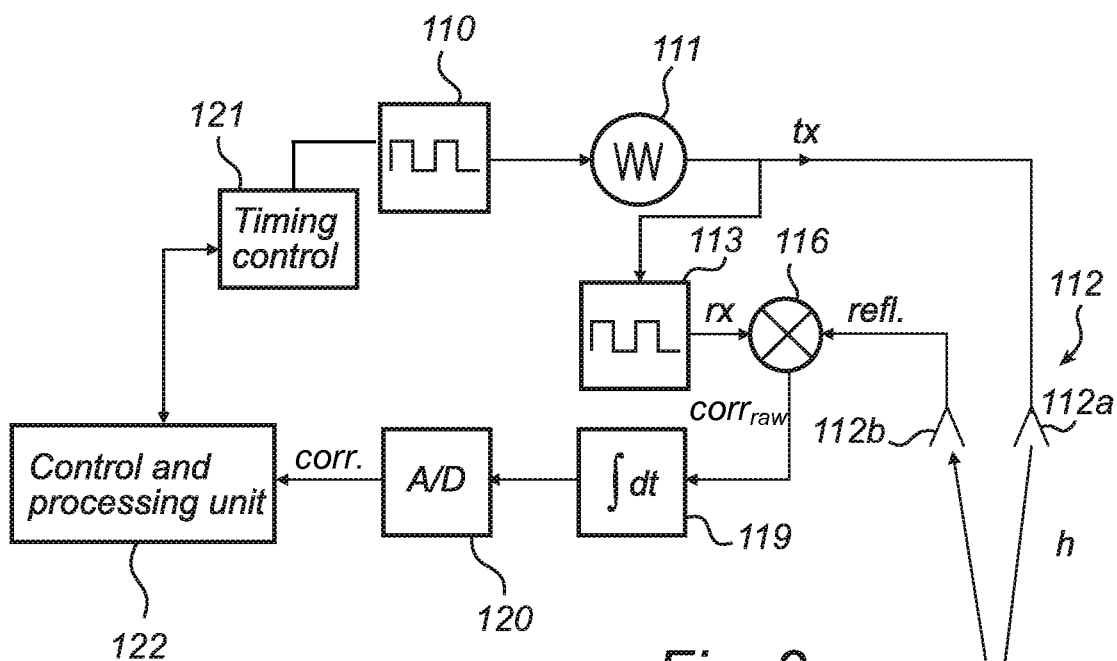
FIG. 3 is a block diagram of a pulsed radar level gauging system according to one embodiment of the present invention.

FIG. 3 shows a simplified block diagram of a pulsed radar system 1 provided in the tank 5 containing a product 6, the level h of which is to be measured. The system comprises a pulse generator 110, adapted to generate short continuous trig pulses to cause the modulator 111 to produce a pulse train tx of short coherent RF-modulated pulses having a predetermined pulse repetition frequency, PRF. The modulation frequency frf is preferably 2-10 GHz or higher and the repetition frequency PRF typically some MHz. The pulses have a duration, T, of typically more than a 100 picoseconds up to a few nanoseconds, depending on required resolution of echoes in the system.

The output of the modulator 111 is connected to a propagation device 112, adapted to allow electromagnetic signals to propagate into the tank and to return electromagnetic signals reflected from the tank. The propagation device 112 can, as illustrated here, include two free radiating antennas 112a, 112b (one emitting antenna and one receiving antenna), or include only one antenna and a directional coupler allowing the one antenna to act both as emitter and receiver. Alternatively, the propagation device may comprise a wave guiding probe extending into the tank. The probe can be a twin probe, a coaxial probe, or a surface guiding probe.

The output of the modulator 111, is also connected to a delay circuitry 113, which introduces a predetermined and fixed time delay Td relative the transmission signal tx. The output of the delay circuitry is called the reference signal, rx, and is connected to one of the input terminals of a mixer 116. In other words, the pulses of the reference signal, rx, have the same pulse repetition frequency PRF and essentially an identical wave form as the pulses in the transmission signal, tx.

The other input terminal of the mixer 116 is connected to the propagation device 112. The output of the mixer 116 is connected to an integrator 119, such as a sample-and-hold circuit, in turn connected to an A/D-converter 120. A timing control 121 connected to a processor 122 is arranged to control the pulse generator 110; and the processor 122 is also supplied with the output from the A/D-converter 120 for determining a measurement result.

In use, the pulse train tx from the modulator 111 is supplied to the propagation device 112 which directs an electromagnetic signal towards the surface 7 of the product. A reflected wave, refl, is returned by the propagation device 112 and supplied to the mixer 116. Amplifiers (Low Noise Amplifiers, LNA), not shown here, could optionally be provided in front of the mixer in order to increase the sensitivity of the system.

The received signal, refl, will continuously supply the mixer with pulses at a rate equal to the pulse repetition frequency PRF, but with a fixed delay, Techo. This delay is the sum of internal fixed delays and round trip time for the signal to travel the distance from propagation device and back, i.e. the distance 2 h. Delays from internal distances in transmitter and receiver parts of the instrument is considered to be known, which enables discrimination of the distance.

The received signal refl is "sampled" in the mixer with the reference signal rx from the modulator 14. The mixer only supplies output when input signals are available simultaneously on both inputs, which happens when the reference signal rx passes the time domain for the received signal, refl. Each such correlation, or sample, during the passage produces a pulse proportional to the momentary product of the input signals The output from the mixer 16 is supplied to the sample-and-hold circuit 119, that generates a continuous analogue tank signal IF, representing a cross correlation of the signals rx and refl. The process and various signals are illustrated in FIG. 4.

Figure 4A:
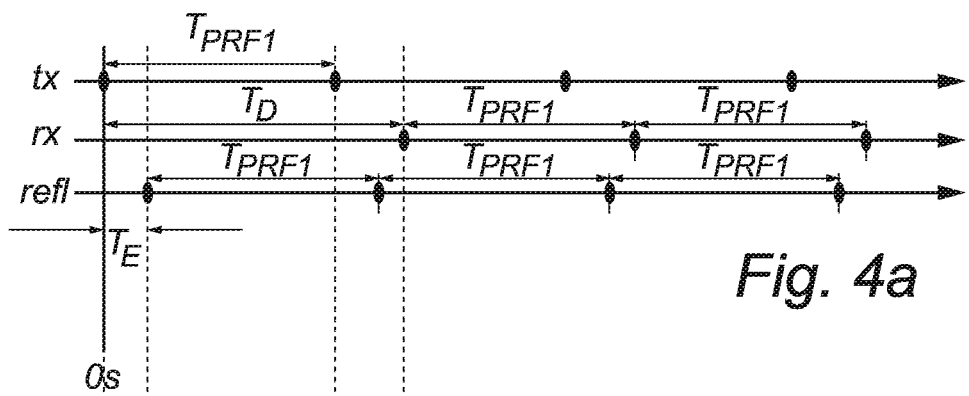
FIGS. 4a-c are respective schematic representations of the various signals in the RLG system illustrated in FIGS. 2 and 3.
Figure 4B:
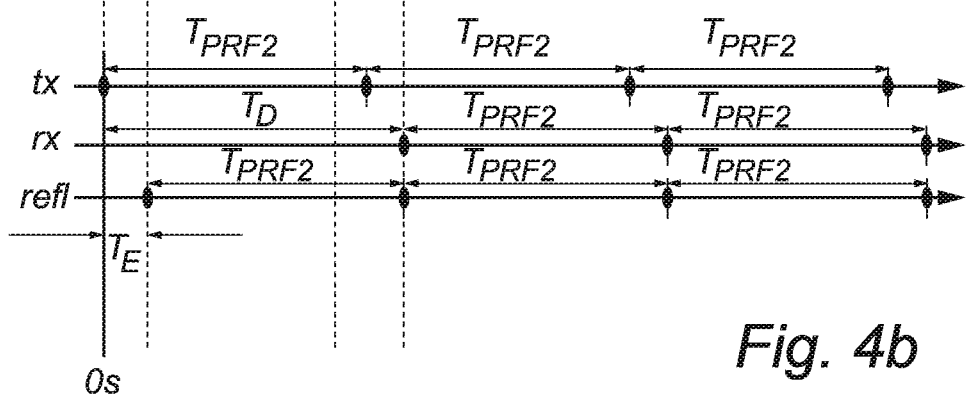

With reference to FIGS. 4a and 4b, the basic principle behind the level measurement is described. In the first example, shown in FIG. 4a, the transmission signal, tx, has a first pulse repetition frequency PRF1 resulting in a time separation between the pulses $T_{PRF1}$ equal to 1/PRF1. As described above, the reference signal is delayed by $T_D$, being more than $T_{PRF1}$ but less than $2*T_{PRF1}$, compared to the transmission signal tx; and the reflected signal refl is delayed by $T_E$ compared to the transmission signal tx. Further, all the signals tx, rx and refl, have the same pulse repetition frequency.

In the second example, shown in FIG. 4b, everything is equal to the example described in relation to FIG. 5a, except that the pulse repetition frequency PRF2 has been slightly lowered, PRF2<PRF1. As can be seen in the FIGS. 5a and 5b the time correlation between the reference signal rx and the reflected signal refl is higher in FIG. 5b compared to FIG. 5a, as the time separation between the signals in FIG. 5b are significantly lower. In other words, provided that the time delay $T_D$ of the reference signal rx, and the pulse repetition frequency PRF resulting in a time coincidence between the signals are known, the delay of the reflected signal $T_E$ relative the transmission signal may be calculated from the following expression $T_E=T_D-1/PRF$.

Moreover, information about the time correlation between the reference signal rx and the reflected signal refl may be received by varying the pulse repetition frequency of the transmission signal tx, and thereby also varying the pulse repetition frequency of the reference signal rx and the reflected signal refl; and analyzing the time correlation value for the reference signal rx and the reflected signal refl for the different pulse repetition frequencies.

According to one example, a set of different pulse repetition frequencies are generated and the associated time correlation value, i.e. the time correlation value between the reference signal rx and the reflected signal refl, for different pulse repetition frequencies are identified. Based on this, a pulse repetition frequency corresponding to a high degree of time coincidence is selected and used for determining $T_E$.

According to one example, a predetermined number of different pulse repetition frequencies are generated. In general, the number of different pulse repetition frequencies to be generated is normally a tradeoff between keeping the time and power consumption low verses increasing the accuracy of the measurement. E.g. if it is known that the echo is within a certain distance, a few PRF:s coarsely covering this distance may be generated and used for achieving a rough indication of the position of the echo. Thereafter, more PRF:s may med generated which more narrowly covers the vicinity of the supposed position of the echo. By this iterative or zooming process the position of the echo may be determined with a desired degree of accuracy. In general, the number of pulses in one pulse train is a tradeoff between time and energy consumption verses the accuracy of the measurement. The higher the number of pulses that are used when forming the correlation value, the better the accuracy and the lower the noise. However, if only a rough value is needed it might be enough with e.g. 5 pulses or 10 pulses. However, the number of pulses by also be higher, such as 20, or 50 or 100, or 1000 or 10 000. From a practical point of view, the number of pulses generated should normally be sufficiently many to enable an output value that is higher than the noise level. In other words, the number of pulses should normally be sufficiently many to account for e.g. the time constant and the associated mixer.

Figure 4C:
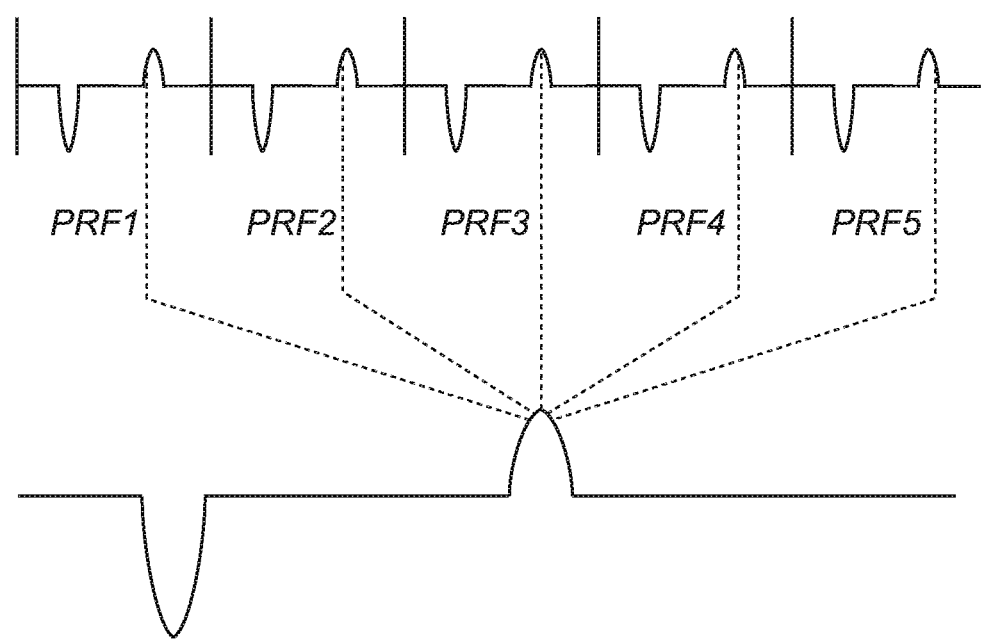

FIG. 4c schematically illustrates how 5 different PRF:s may be used for zooming in on a correlation peak. At the top of the Figure there is a real time signal from the mixer, according to one embodiment of the invention. Assume a constant distance to the surface h [as shown in FIG. 3], five different PRF values will then correspond to five different sections of the real time signal from the mixer, as is indicated by the five vertical dotted lines. At the bottom of FIG. 4c there is a time expansion of the real time signal from the mixer, whereon the five different sections are indicated the time expansion being received from the integrator 19. According to this example the positive peak corresponds to a true coincidence between the reference signal and the reflected signal, while the negative peak corresponds to a reference peak used when compensating for e.g. temperature dependence of the delay elements; the negative peak being a reference echo somewhere in the signal path. In other words, any suitable number of PRF:s may be used, so that a any desired parts of the reflected signal may be analyzed. I.e. the part of the reflected signal that is analyzed may range from a distance corresponding to just a few micrometers to the full tank length. I.e. the generated PRF:s may cover any range from just few micrometers to the full tank length, and be evenly distributed across this length or grouped together in one or more groups. Further, the ratio between two consecutive PRF;s may be arbitrary chosen so as to suit the application at hand.

In order to provide unambiguity, i.e. that the each PRF may only correspond to one TE, the time separation between the pulses 1/PRF should preferably be greater than the longest expected $T_E$. Additionally, the delay of the reference signal should preferably be selected such that $T_d/2<1/PRF<T_d$.

If the target range is sufficiently short and/or the internal time delay $T_D$ sufficiently long, the method can be generalized to detect coincidences at $T_E=T_D-m/PRF$, where m is an integer lager or equal to one, measuring how may PRF cycles later the internal pulse is coinciding with the reflected pulse.

Figure 5:
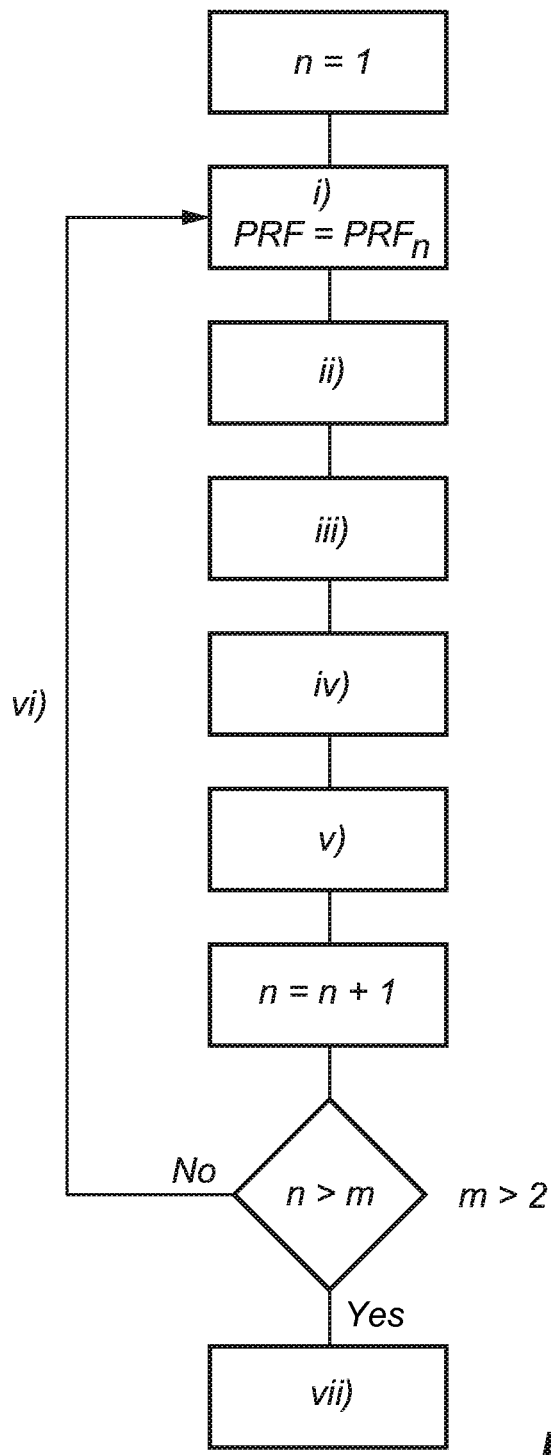
FIG. 5 is a block diagram illustrating the steps of the method according to the invention.

In FIG. 5 presents a block diagram illustrating the steps of the method for determining a distance to a surface of a product in a tank based on a time delay of electromagnetic signals propagating between a predefined reference and a surface of said product, said method comprising the steps of:
  i) generating a transmission signal in the form of a first pulse train having a predetermined pulse repetition frequency, said first pulse train comprising at least 5 pulses;
  ii) generating a reference signal in the form of a second pulse train by generating a predefined and fixed time delay between said first and second pulse trains relative each other;
wherein each pulse in said first and second pulse trains have essentially identical waveforms;
  iii) guiding said transmission signal into the tank as electromagnetic signals, and allowing said waves to propagate towards said surface;
  iv) receiving a reflected signal reflected from the tank;
  v) forming a correlation value based on a time correlation between a pulse of the reference signal and the reflected signal, and storing said correlation value and the associated pulse repetition frequency;
  vi) carrying out steps i) to v) in sequence for at least three different pulse repetition frequencies, until at least three pairs of correlation values and associated pulse repetition frequencies have been stored;
  vii) determining said distance based on said at least three pairs of correlation values and associated pulse repetition frequencies, and said fixed time delay between the reference signal and the transmission signal.

In other words, there is provided a radar level gauge system 1 for determining a distance h of a content in a tank 5 based on a time delay $T_E$ of electromagnetic signals propagating between a predefined reference 3 and a surface of said product 7, said radar level gauge system comprising:
   a transmitter 110 for transmitting a transmission signal tx in the form of a first pulse train having a first pulse repetition frequency PRF and comprising at least 5 or 10 pulses,
   a propagation device 112a adapted to receive said transmission signal and guiding said transmission signal as electromagnetic signals into the tank, and allowing said waves to propagate towards said surface,
   a receiver 112b for receiving a reflected signal reflected in said tank,
   a delay circuitry 113 adapted to generate a reference signal rx by receiving said transmission signal and delaying the pulses in the received pulse train by a predefined and fixed time delay $T_D$,
wherein each pulse in the pulse train of said transmission signal tx and each pulse in the pulse train of said reference signal rx have essentially identical waveforms,
   a mixer 116 adapted to receive said reflected signal refl and said reference signal rx, and to generate a correlation value cv representing a time correlation between a pulse of the reference signal and a pulse of the reflected signal,
   a control circuit 121 adapted to control the pulse repetion frequency of said transmission signal at said transmitter 110,
   a processing circuitry 122 adapted to receive at least three different pulse repetition frequencies and a correlation value associated with each of said at least three different pulse repetition frequencies, and to determine said process value h based on said at least three different pulse repetion frequencies PRFx, the associated correlation value cvx and the fixed time delay $T_{Dx}$.

It is noted that the invention has mainly been described above with reference to a few embodiments. However, as is readily appreciated by a person skilled in the art, other embodiments than the ones disclosed above are equally possible within the scope of the invention, as defined by the appended claims. It is further noted that, in the claims, the words "comprising" does not exclude other elements or steps, and the indefinite article "a" or "an" does not exclude a plurality. A single apparatus or other unit may fulfill the functions of several items recited in the claims or illustrated in the drawings. The mere fact that certain measures are recited in mutually different dependent claims does not indicate that a combination of these measures cannot be used to an advantage.

What is claimed is:

1. A method for determining a distance to a surface of a product in a tank based on a time delay of electromagnetic signals propagating between a predefined reference and a surface of said product, said method comprising the steps of:
   i) generating a transmission signal in the form of a first pulse train having a predetermined pulse repetition frequency, said first pulse train comprising at least 5 pulses having a constant pulse repetition frequency;
   ii) generating a reference signal in the form of a second pulse train by generating a predefined and fixed time delay between said first and second pulse trains relative each other;
     wherein each pulse in said first and second pulse trains have essentially identical waveforms;
   iii) guiding said transmission signal into the tank as electromagnetic signals, and allowing said signals to propagate towards said surface;
   iv) receiving a reflected signal reflected from the tank;

v) forming a correlation value based on a time correlation between a pulse of the reference signal and the reflected signal, and storing said correlation value and the associated pulse repetition frequency;

vi) carrying out steps i) to v) in sequence for at least three different pulse repetition frequencies, until at least three pairs of correlation values and associated pulse repetition frequencies have been stored;

vii) determining said distance based on said at least three pairs of correlation values and associated pulse repetition frequencies, and said fixed time delay between the reference signal and the transmission signal.

2. The method according to claim 1, wherein in step vi) the carrying out of steps i) to v) are performed a predetermined number of times.

3. The method according to claim 1, wherein in step vi) the carrying out of steps i) and v) are performed until a maxima for the time correlation between the transmission signal and the reference signal has been identified.

4. The method according to claim 1, wherein in step vi) the carrying out of steps i) to v) are performed until a first condition has been met, the first condition being at least one of: the correlation value exceeds a predetermined value, the correlation value falls below a predetermined value and the correlation value is equal to a predetermined value.

5. The method according to claim 1, wherein in step vii) the determining of said process value is based on the formula $T_E = Td - 1/PRF$, where $T_E$ is the delay time of the reflected signal relative the transmission signal, Td is the predetermined and fixed time delay of the reference signal and PRF is the pulse repetition frequency of both the reference signal and the reflected signal.

6. The method according to claim 1, wherein step vii) comprises identifying the pulse repetition frequency associated with the highest correlation value among the correlation values which were stored in step v.

7. The method according to claim 1, wherein step vii) comprises using interpolation to determine the pulse repetition frequency associated with the highest time correlation between the measurement signal and the reflected signal.

8. The method according to claim 1, wherein the predetermined and fixed time delay of the reference signal is larger than both the pulse repetition frequency as well as the delay time of the reflected signal compared to the transmission signal.

9. The method according to claim 8, wherein $1/PRF > T_{Emax} - T_{Emin}$, where PRF is any of the at least three pulse repetition frequencies, $T_{Emax}$ is the time delay of the reflected signal at the lowest surface level of interest, and $T_{Emin}$ is the time delay of the reflected signal at the highest surface level of interest.

10. A radar level gauge system for determining a distance to a surface of a product kept in a tank based on a time delay of electromagnetic signals propagating between a predefined reference and a surface of said product, said radar level gauge system comprising:

a transmitter for transmitting a transmission signal in the form of a first pulse train having a constant pulse repetition frequency and comprising at least 5 pulses, a propagation device adapted to receive said transmission signal and guiding said transmission signal as electromagnetic signals into the tank, and allowing said signals to propagate towards said surface, a receiver for receiving a reflected signal reflected in said tank, a delay circuitry adapted to generate a reference signal by receiving said transmission signal and delaying the pulses in the received pulse train by a predefined and fixed time delay, wherein each pulse in the pulse train of said transmission signal and each pulse in the pulse train of said reference signal have essentially identical waveforms, a mixer adapted to receive said reflected signal and said reference signal, and to generate a correlation value representing a time correlation between a pulse of the reference signal and a pulse of the reflected signal, a control circuit adapted to control the pulse repetition frequency of said transmission signal at said transmitter, processing circuitry adapted to receive at least three different pulse repetition frequencies and correlation value correlation value associated with one of said at least three different pulse repetition frequencies, wherein the processing circuitry is adapted to determine said distance based on said at least three different pulse repetition frequencies, the correlation values, and the fixed time delay.

11. The radar level gauge system according to claim 10, wherein said transmitter comprises a pulse generator for generating a pulse train.

12. The radar level gauge system according to claim 10, wherein the mixer is arranged to provide an output pulse for each received pulse of the reflected signal, each output pulse being equal to a time correlation of said reference signal and said reflected signal.

13. The radar level gauge system according to claim 12, further comprising a sample-and-hold circuit adapted to receive said output pulses from said mixer and provide a continuous output which, at every given moment, is equal to the latest output pulse from the mixer, said continuous output being used as said correlation value.

14. The radar level gauge system according to claim 10, wherein said predetermined and fixed time delay introduced by said delay circuit is the same for each one of said at least three different pulse repetition frequencies.

15. The radar level gauge system according to claim 10, wherein said propagation device comprises at least one of a probe for guided wave transmission of said electromagnetic waves, an antenna for free propagation of said electromagnetic waves, and a hollow waveguide for guided propagation of said electromagnetic waves.

* * * * *